Figure 4:
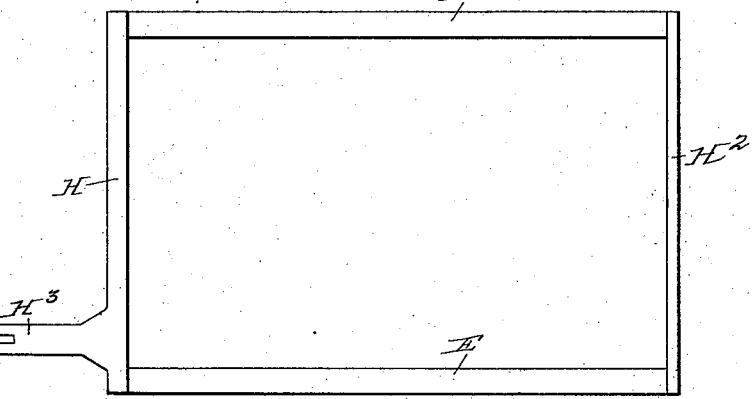

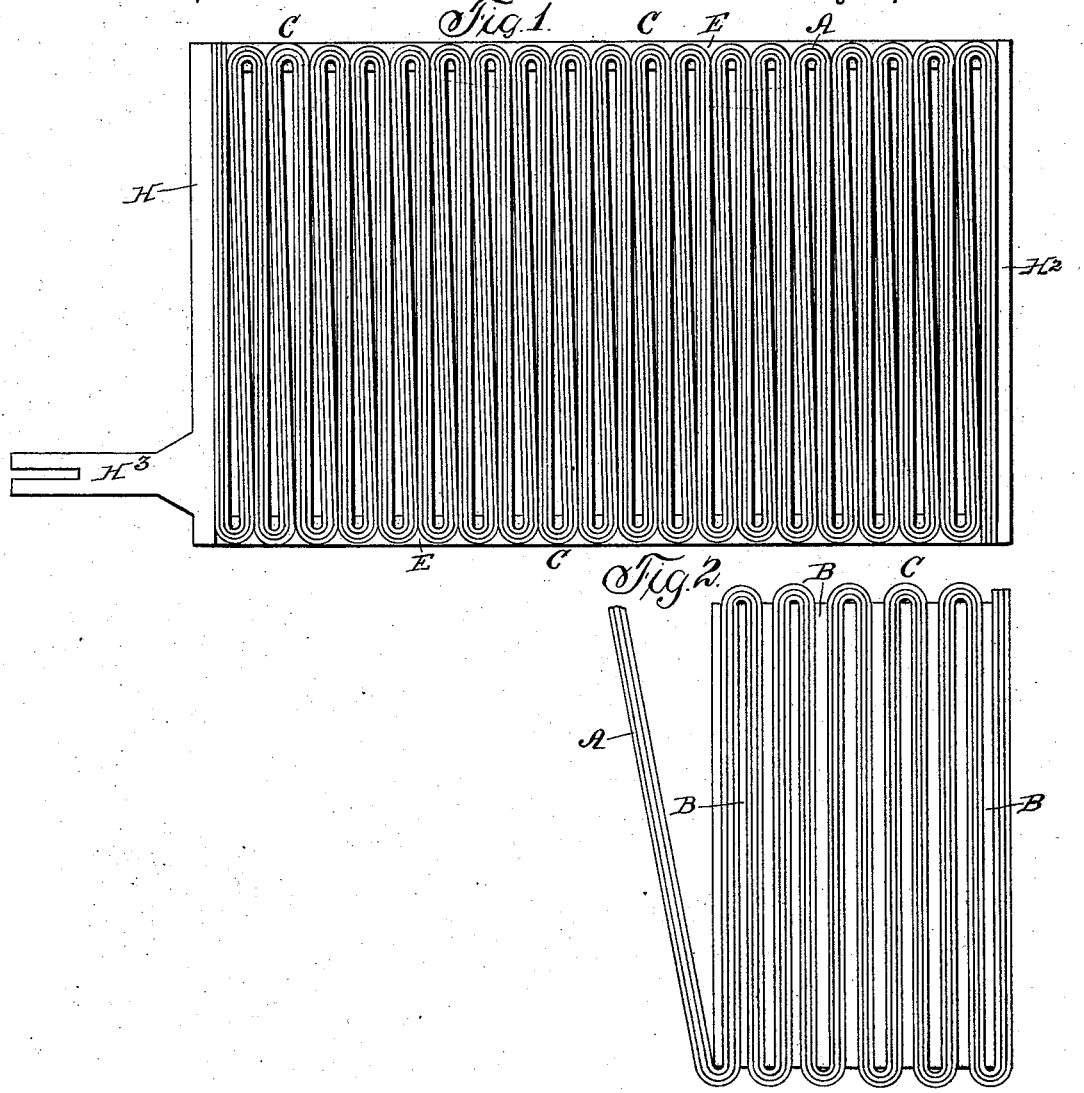

(No Model.) 2 Sheets—Sheet 2.

W. MORRISON.
ELECTRODE FOR SECONDARY BATTERIES.

No. 522,479. Patented July 3, 1894.

Witnesses
F. C. Tate
G. R. Green

Inventor,
William Morrison,
by Charles C. Bulkley,
his Atty.

UNITED STATES PATENT OFFICE.

WILLIAM MORRISON, OF DES MOINES, IOWA, ASSIGNOR TO THE AMERICAN BATTERY COMPANY, OF CHICAGO, ILLINOIS.

ELECTRODE FOR SECONDARY BATTERIES.

SPECIFICATION forming part of Letters Patent No. 522,479, dated July 3, 1894.

Application filed April 25, 1892. Serial No. 430,483. (No model.)

*To all whom it may concern:*

Be it known that I, WILLIAM MORRISON, a citizen of the United States, residing at Des Moines, in the county of Polk and State of Iowa, have invented certain new and useful Improvements in Electrodes for Secondary Batteries, of which the following is a specification.

My invention relates to that class of storage battery or voltaic accumulator known as the "Planté" type, in which type the material of the electrodes is "formed" by the action of the current as contradistinguished from that class of battery in which the active material or material to become active is mechanically applied to a supporting plate or grid.

In the well known secondary plate of the Planté type the material to become active consists of a solid mass of metallic lead which is formed into a porous condition by repeated, successive and reversed primary charges, and secondary discharges, with intermediate intervals of rest, this process of formation being of long duration and expensive by reason of the amount of current necessary to complete the formation of the plate, and ultimately providing a plate capable of but a small out-put.

In the well known Faure type the plate is constructed by the mechanical application of lead oxide in the form of a paste or cement, so also metallic lead and mercury in a granulated state has been mechanically applied to the supporting plate or grid, the mercury being eliminated to produce permeability or porosity, but it is well known that the greatest difficulty experienced in plates of this character arises from the scaling or falling off of the active material from the grid in the operation of the battery.

The object of my present invention is to so construct a battery plate as that the utmost extent of surface is presented to the action of the electrolyte in the operation of the battery, which plate may be formed with the utmost facility and readiness, and which shall also be of such a character as to prevent free expansion in the charge and thus prevent the injurious effects incident to warping and buckling, and which shall be firmly and securely bound and held together in such a manner as that the parts thereof resist all tendency to separate under the charge.

My object further is to provide a plate which is formed practically and with expedition wholly and solely by the current of electricity without the mechanical application of oxides to a support, frame or grid, which plate is intimately bound along its edges, and which has equal spaces extending alternately from one side of the plate to the other, whereby ample opportunity is given for the free and equal expansion of the material in the primary charge so that the parts of the plate cannot by any possibility be severed or disjoined, these results being accomplished by means which produce a completed electrode of much less weight and which is produced at a materially less expense, and in addition to the other advantages enumerated also providing an electrode of maximum conductivity.

In the manufacture of electrodes of the Planté type in which the electrode is "formed" by the electric current my invention consists first in providing a suitable length or lengths of material to be acted upon by the current, which material is cut into a strip or strips of a ribbon or tape form, and, as a preliminary step before being secured and built up in the form of a plate or electrode in winding a plurality of said strips of ribbon or tape of material in a serpentine form in such a manner as that spaces are formed between the turns, compressing and bringing together the turns of the strips at their ends and then securing their ends firmly in a fixed position by any suitable means, so that alternately equal spaces are provided extending from one side or end of the completed electrode to the other.

In the manufacture of electrodes of the Planté type in which the electrode is "formed" by the electric current my invention consists further in providing suitable strips of material of a tape or ribbon form, and as a preliminary step, winding said strips in a serpentine form in such manner as that after the ends of the turns are compressed and brought together spaces are provided extending from end to end of the electrode to admit of free and equal expansion in the primary charge, and in holding the ends of said turns of material by means of conducting rods firmly secured along or at the ends of the same.

My invention consists further in certain details of arrangement and construction about to be particularly described, reference being now had to the accompanying drawings, in which—

Figure 5:
Figure 6:
Figure 7:
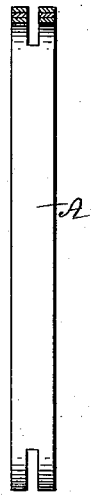

Figure 1 is a side view of a completed electrode constructed in accordance with my improved plan. Fig. 2 is a detail view showing the preliminary act of winding. Fig. 3 is an edge view of the electrode shown in Fig. 2. Fig. 4 is a side view of the frame formed by the conducting rods. Fig. 5 is an edge view showing the manner of connecting together the conducting rods. Fig. 6 is an edge view of the plate shown in Fig. 1. Fig. 7 is a detail view of one of the lengths of material.

In the construction of this form of plate or electrode I provide a plurality of continuous strips as shown in Figs. 1 and 2, of the material lead, cut into the form of a tape or ribbon, and designated by the letter A, which I wind or bend about separate cores B, into the form shown in Fig. 2, and afterward remove the said cores B and compress the ends C of the turns and bring said ends together. I then cut grooves or slots D, in that which is now in the form of an electrode, on each side thereof, and insert and secure in said grooves D the side conducting rods E, E. I also provide top and bottom conducting rods H, H², the rod H having the terminal H³, these rods being connected to the ends of the side conducting rods E, E. I preferably secure the conducting rods firmly in position and also the ends C of the turns of the material by immersing the sides of the plates in a suitable molten solder, which feature however I do not claim herein, as the same is described and claimed in an application, Serial No. 430,484, filed concurrently herewith, nor do I desire it to be understood that I limit myself to conducting rods of any description joined with the plates constructed as shown, nor to the manner in which the said conducting rods are secured to the plate, although the same constitutes a part of my invention. By this means of construction I provide an electrode for secondary batteries "formed" by the primary current, consisting in a multiplicity of leaves or strips of material so securely held as that equal alternate spaces are provided extending from one side of the electrode to the other, and thus affording ample opportunity for the free expansion of the material under charge, so that the injurious results following from warping, binding and buckling are avoided, and providing a plate in which the formation is materially expedited, since the current enters immediately to the interior of the plate and thus shortens the time occupied in superficial attacks.

I am aware that electrodes for storage batteries of this type have heretofore been constructed, in which material has been "fluted," built up into a plate, and afterward each individual and separate one of the flutes severed or cut to provide spaces, but this mode is impracticable in view of the laboriousness of the process and the length of time required to construct a plate.

Having thus described my invention, what I claim as new therein, and desire to secure by Letters Patent of the United States therefor, is—

1. As a new article of manufacture, an electrode for secondary batteries constructed of a plurality of continuous strips of the requisite material to become active, bent in a serpentine form, with the convolutions of the strips extending the width of the electrode and alternating with spaces or openings having the wide end of one adjacent to the narrow end of the next and extending in the direction of the length of the strips, and means for securing the strips together, substantially as described.

2. As a new article of manufacture, an electrode for secondary batteries constructed of continuous strips of the requisite material to become active bent in a serpentine form with the convolutions of the strips extending the width of the electrode and alternating with spaces or openings extending in the direction of the length of the strips and with notches in the ends of the turns, and conducting rods arranged in the notches for securing the strips together, substantially as described.

3. As a new article of manufacture, an electrode for secondary batteries constructed of continuous strips of the requisite material to become active bent in a serpentine form, the convolutions of each strip or series of strips when in position for use extending the width of the electrode and contiguous at its opposite ends on opposite sides with adjacent strips or series of strips and alternating with spaces or openings extending in the direction of the length of the strips or series of strips and with notches in the ends of the turns, and conducting rods arranged in the notches for securing the strips together, substantially as described.

4. As a new article of manufacture, an electrode for secondary batteries constructed of a plurality of continuous strips of the requisite material to become active arranged in series and bent in a serpentine form with the convolutions of the strips extending the width of the electrode and alternating with spaces or openings extending in the direction of the length of the strips, and with notches in the ends of the turns, and conducting rods arranged in the notches for securing the series of strips together, substantially as described.

5. As a new article of manufacture, an electrode for secondary batteries the body of which is formed by a band composed of a plurality of lead ribbons in close contact throughout, said band being folded and refolded flatwise of the ribbons and having spaces within the folds to provide for the thickening of the ribbons by the expansion of the lead, substantially as described.

WILLIAM MORRISON.

Witnesses:
CHARLES C. BULKLEY,
RAYMOND GREEN.